United States Patent [19]

Nagai et al.

[11] Patent Number: 4,732,950

[45] Date of Patent: Mar. 22, 1988

[54] CATHODIC ELECTRODEPOSITION COATING COMPOSITION

[75] Inventors: Masanori Nagai, Yokohama; Kenji Hasui, Ayase; Toshio Shinohara, Yokohama, all of Japan

[73] Assignee: Dai Nippon Toryo Co., Ltd., Osaka, Japan

[21] Appl. No.: 12,497

[22] Filed: Feb. 9, 1987

[30] Foreign Application Priority Data

Feb. 25, 1986 [JP] Japan .................................. 61-40099

[51] Int. Cl.$^4$ .......................... C25B 13/06; C08K 3/20
[52] U.S. Cl. .................................... 525/524; 525/527; 523/404; 523/413; 523/416; 523/424; 204/181.7; 524/901
[58] Field of Search ...................... 204/181.7; 524/901; 523/404, 413, 416, 424, 403; 525/524, 527

[56] References Cited

U.S. PATENT DOCUMENTS

| | | | |
|---|---|---|---|
| 4,283,313 | 8/1981 | Omika et al. | 204/181.7 |
| 4,370,453 | 1/1983 | Omika et al. | 204/181.7 |
| 4,543,406 | 9/1985 | Otsuki et al. | 528/111.5 |
| 4,579,886 | 4/1986 | Otsuki et al. | 204/181.7 |

*Primary Examiner*—John F. Niebling
*Assistant Examiner*—Ben C. Hsing

*Attorney, Agent, or Firm*—Oblon, Fisher, Spivak, McClelland & Maier

[57] ABSTRACT

A cathodic electrodeposition coating composition which comprises:

(A) 100 parts by weight of an amine-unsaturated carboxylic acid adduct of epoxidized polybutadiene having a number average molecular weight of from 500 to 10,000 and containing from 70 to 200 mmol of a tertiary amino group, from 20 to 200 mmol of an α,β-unsaturated monocarboxylate group and from 200 to 2,000 mmol of a carbon-carbon double bond, per 100 g of the resin;

(B) from 20 to 200 parts by weight of an addition reaction product of (a) 1 mol of an epoxy resin containing at least two epoxy groups per molecule, and (b) from 1.5 to 2.0 mol of an α,β-unsaturated monocarboxylic acid;

(C) from 5 to 50 parts by weight of an addition reaction product of (a) 1 mol of an epoxy resin containing at least two epoxy groups per molecule, and (b) a mixture of from 0.5 to 1.5 mol of an α, β-unsaturated monocarboxylic acid and from 0.5 to 1.5 mol of a secondary amine, provided that the total amount of the two components of the mixture is from 1.5 to 2.0 mol; and (D) from 0 to 100 parts by weight of other optional water-dilutable resin.

9 Claims, No Drawings

CATHODIC ELECTRODEPOSITION COATING COMPOSITION

The present invention relates to a cathodic electrodeposition coating composition. More particularly, it relates to a cathodic electrodeposition coating composition capable of forming a coating film having excellent corrosion resistance and low-temperature curability.

As is well known, an electrodeposition coating process is a coating method wherein an object to be coated is immersed in an ionized water-soluble or water-dispersible paint, and a voltage is applied between electrodes to form a coating film on the surface of the object. Electrodeposition paints useful for this process include anodic electrodeposition paints having a carboxylic acid group introduced into the resin itself and designed to be neutralized with an amine, and cathodic electrodeposition paints having an amino group introduced in the resin itself and designed to be neutralized with an acid. Cathodic electrodeposition paints have been widely used as coating compositions effective for rust-prevention of e.g. steel plates for automobiles, since they have excellent throwing power and coating films thereby obtained have excellent adhesion to substrates and excellent corrosion resistance, as compared with anodic electrodeposition paints.

Cathodic electrodeposition coating compositions presently practically employed, are usually of a cross-linked type composed of an amine-modified epoxy resin and a blocked isocyanate, as disclosed, for example, in Japanese Unexamined Patent Publications No. 8746/1977 and No. 86735/1978, and Japanese Examined Patent Publications No. 47143/1978 and No. 8568/1978.

However, since such conventional cathodic electrodeposition coating compositions were of a cross-linked type made of a blocked isocyanate, the blocking agent dissociated during the baking was likely to adhere as a resinous sticky substance to the furnace wall, thus leading to troubles such that a number of steps were required for cleaning the drying furnace, or the products were likely to be stained. Further, the coating film underwent thinning, which was uneconomical, and a large amount of fume was thereby generated, which was undesirable from the environmental point of view.

If the baking was conducted at a temperature lower than the dissociation temperature of the blocking agent, there was a problem that the film-forming efficiency was extremely low. Thus, it has been desired to develop a cathodic electrodeposition coating composition which undergoes a minimum loss on heating during the baking operation and which permits low-temperature baking, while maintaining corrosion resistance as high as conventional compositions.

Further, conventional cathodic electrodeposition coating compositions composed mainly of an epoxy resin had difficulties such that the coating film thereby obtained tended to be so hard that the flexibility was poor, and the physical properties such as the impact resistance tended to be inferior. Furthermore, it was difficult to form a thick coating of a level of from 30 to 40 $\mu$m, and the edge covering was not good. In particular, there were problems such that pinholes or craters were likely to form during the coating on a galvanized steel plate.

On the other hand, a cross-linked system wherein no blocked isocyanate compound is employed, has been developed.

For instance, U.S. Pat. No. 4,370,453 discloses an electrodeposition coating composition comprising (I) a resin obtained by the addition of an amine and an unsaturated monocarboxylic acid to an epoxidized polybutadiene, and (II) an addition reaction product of an epoxy resin and an unsaturated monocarboxylic acid. However, such a system has a difficulty that components (I) and (II) are inferior in the compatibility, and no adequate film-forming efficiency is thereby obtainable. There have been some attemps to solve such a difficulty.

For example, there have been proposed a composition wherein a reaction product obtained by adding a fatty acid to the above component (I), is employed (Japanese Unexamined Patent Publication No. 229967/1985); a coating composition wherein a reaction product obtained by reacting to the above component (II) (a) a fatty acid, (b) a dicarboxylic acid and an epoxy compound, or (c) a dicarboxylic anhydride and an epoxy compound, is used (U.S. Pat. No. 4,543,406); a coating composition wherein a third component (such as a monocarboxylic acid or its dimer, or a dicarboxylic acid) is incorporated to the above components (I) and (II) or to two such components modified with fatty acids (European Pat. No. 159,883); and a coating composition wherein the above components (I) and (II) may be modified with fatty acids, if necessary, and a blocked isocyanate compound is incorporated thereto as a third component (U.S. Pat. No. 4,579,886).

However, none of such proposals has presented adequately satisfactory film-forming properties (particuarly corrosion resistance) and adequate outer appearance of the coating films.

The present inventors have conducted extensive researches with an aim to solve the above-mentioned difficulties inherent to the conventional techniques, and have finally arrived at the present invention.

Accordingly, it is an object of the present invention to solve the above-mentioned problems inherent to the conventional techniques and to provide a cathodic electrodeposition coating composition which undergoes a minimum loss of the coating film during the baking, which has excellent corrosion resistance and is curable a low temperatures, and which is capable of forming a coating film having good film properties and a sufficient thickness so that it presents a good looking outer appearance even when coated on a galvanized steel plate and it presents an excellent distinctness of image after the application of a top coating.

Thus, in order to solve the above-mentioned difficulties of conventional compositions, the present invention provides a cathodic electrodeposition coating composition which comprises:

(A) 100 parts by weight of an amine-unsaturated carboxylic acid adduct of epoxidized polybutadiene having a number average molecular weight of from 500 to 10,000 and containing from 70 to 200 mmol of a tertiary amino group, from 20 to 200 mmol of an $\alpha,\beta$-unsaturated monocarboxylate group and from 200 to 2,000 mmol of a carbon-carbon double bond, per 100 g of the resin;

(B) from 20 to 200 parts by weight of an addition reaction product of (a) 1 mol of an epoxy resin containing at least two epoxy groups per molecule, and (b)

from 1.5 to 2.0 mol of an α,β-unsaturated monocarboxylic acid;

(C) from 5 to 50 parts by weight of an addition reaction product of (a) 1 mol of an epoxy resin containing at least two epoxy groups per molecule, and (b) a mixture of from 0.5 to 1.5 mol of an α,β-unsaturated monocarboxylic acid and from 0.5 to 1.5 mol of a secondary amine, provided that the total amount of the two components of the mixture is from 1.5 to 2.0 mol; and (D) from 0 to 100 parts by weight of other optional water-dilutable resin. In the above composition, the constituent (b) of component (B) may be substituted by a mixture of from 0.7 to 1.9 mol of an α,β-unsaturated monocarboxylic acid and from 0.1 to 0.8 mol of an unsaturated or saturated fatty acid having at least 12 carbon atoms, provided that the total amount of the two components of the mixture is from 1.5 to 2.0 mol.

Now, the present invention will be described in detail with reference to the preferred embodiments.

Component (A) to be used in the present invention, i.e. the amine-unsaturated carboxylic acid adduct of epoxidized polybutadiene, is usually obtained by epoxidizing a polybutadiene having a carbon-carbon double bond in a conventional manner, and then adding a secondary amine and an α,β-unsaturated monocarboxylic acid sequentially to the epoxy groups of the epoxidized polybutadiene thus obtained (oxirane oxygen content: 4–9%). Here, the secondary amine is converted to a tertiary amino group in the resin, and the α,β-unsaturated monocarboxylic acid is converted to an ester group.

The secondary amine to be used for this reaction includes dimethylamine, diethylamine, dibutylamine, diethanolamine, N-methylethanolamine, diisopropanolamine, ethylethanolamine, n- or iso-propylethanolamine and 3-methanolpiperidine. This secondary amine is used in an amount required to form from 70 to 200 mmol of a tertiary amino group per 100 g of component (A). If the amount of the tertiary amino group is less than 70 mmol, the solubility in water tends to be poor. On the other hand, if the amount exceeds 200 mmol, the properties required for the cathodic electrodeposition coating composition, such as re-solubility, the film-forming property, etc. tend to be inferior. The addition reaction of the secondary amine with the epoxidized polybutadiene is conducted usually at a temperature of from 50° to 200° C., preferably from 80° to 150° C. If necessary, a solvent may be used to lower the viscosity of the epoxidized polybutadiene so that a uniform addition reaction can be conducted. As such a solvent, methyl ethyl ketone, xylene, cyclohexane, methyl isobutyl ketone, toluene, ethyl cellosolve, methyl cellosolve, butyl cellosolve, hexyl cellosolve, diacetone alcohol, diethyl ether, ethylene glycol dimethyl ether or diethylene glycol may be used. A solvent miscible with water is preferred. As such a solvent, ethyl cellosolve, butyl cellosolve, methyl cellosolve, hexyl cellosolve, ethylene glycol dimethyl ether, diethylene glycol dimethyl ether, methyl ethyl ketone, diacetone alcohol or diethyl ether may be mentioned.

The α,β-unsaturated monocarboxylic acid to be used for the preparation of component (A), includes acrylic acid and methacrylic acid. The reaction of the amine-adduct of epoxidized polybutadiene with the α,β-unsaturated monocarboxylic acid is conducted usually at a temperature of from 80° to 200° C., preferably from 100° to 140° C. This α,β-unsaturated monocarboxylic acid is used in an amount required to provide from 20 to 200 mmol of the α,β-unsaturated monocarboxylate group per 100 g of component (A). If it is less than 20 mmol, the curing will be inadequate. On the other hand, if it exceeds 200 mmol, the addition reaction of the α,β-unsaturated monocarboxylic acid tends to be difficult, or if reaction can be conducted, the amount of the carbon-carbon double bond tends to be excessive and the stability of the resin tends to be inferior.

The number average molecular weight of the resin of component (A) obtained by the above reaction, is desired to be from 500 to 10,000. If the number average molecular weight is less than 500, the resin tends to be too soft, and the corrosion resistance is likely to be poor. On the other hand, if it exceeds 10,000, the viscosity tends to be too high, thus leading to a deterioration of the working efficiency and of the solubility in water. The amount of the carbon-carbon double bond per 100 g of the resin of component (A) is desired to be from 200 to 2,000 mmol. If the amount is less than 200 mmol, the film curability tends to be low. On the other hand, if it exceeds 2,000 mmol, the stability of the coating composition tends to deteriorate.

Component (B) to be used in the present invention, is obtained by reacting an α,β-unsaturated monocarboxylic acid in an amount of from 1.5 to 2.0 mol to 1 mol of an epoxy resin containing at least two epoxy groups per molecule.

The epoxy resin to be used for this reaction includes, for example, (1) an epoxy resin obtained by the reaction of bisphenol A with epichlorohydrin or with methyl epichlorohydrin, such as Epikote #827, #828, #834, #1001, #1004, #1007, #1009, trade names, manufactured by Shell Chemical Co., ERL #2772, #2774, EKR2002, trade names, manufactured by Union Carbide Co., Araldite GY-#250, #260, #280, #6071, #6084, #6099, trade names, manufactured by Chiba Co., AER #330, #331, #332, #661, #664, trade names, manufactured by Asahi Chemical Industries Co., Ltd., Epicron #800, #1000, #4000, trade names, Dai Nippon Ink Chemical Industries Co., Ltd., (2) an epoxy resin obtained by reacting a novolak or resol obtained by the reaction of a phenol with formaldehyde in the presence of an acidic or alkaline catalyst, with epichlorohydrin or with methyl epichlorohydrin, such as DEN #431, #438, #448, trade names, manufactured by Dow Chemical Co., ECN #1235, #1273, #1280, #1290, trade names, manufactured by Chiba Co., (3) an epoxy resin obtained by reacting a halogenated phenol with epichlorohydrin or with methyl epichlorohydrin, such as DER #511, #542, #580, trade names, manufactured by Dow Chemical Co., Araldite #8011, #8047, trade names, manufactured by Chiba Co., (4) an epoxy resin obtained by reacting an ethylene oxide or propylene oxide adduct of a phenol with epichlorohydrin or with methyl epichlorohydrin, such as EP #4000, #4001, trade names, manufactured by Asahi Denka K.K. These epoxy resins may be used alone or in combination as a mixture. The epoxy equivalent of these epoxy resins is preferably within a range of from 200 to 2,000. In the present invention, particularly preferred is a bisphenol A type epoxy resin having an epoxy equivalent of from 400 to 1,000. Namely, if the epoxy equivalent is less than 400, the curability or the corrosion resistance of the coating film tends to be poor. On the other hand, if it exceeds 1,000, the viscosity tends to be so high that the operation efficiency and the water-dispersibility tend to be poor, and it tends to be difficult to obtain the best condition for the film surface.

The α,β-unsaturated monocarboxylic acid to be used, includes acrylic acid and methacrylic acid. The reaction with the epoxy groups is conducted usually at a temperature of from 80° to 200° C., preferably from 100° to 140° C. If the amount of the α,β-unsaturated monocarboxylic acid for the addition reaction is less than 1.5 mol, the epoxy groups tend to remain excessively in the resin, and the excess amount of the epoxy groups will react to themselves as time passes to form a high molecular substance, whereby the viscosity increases and the stability of the resin tends to deteriorate. On the other hand, if it is used in an amount of more than 2.0 mol for the addition reaction, the excess amount will remain unreacted, such being undesirable. If necessary, a solvent may be used for the addition reaction of the epoxy groups with the α,β-unsaturated carboxylic acid. As such a solvent, any solvent capable of dissolving the epoxy resin and inert to the reaction, may be employed. For example, methyl ethyl ketone, xylene, toluene, cyclohexanone, methyl isobutyl ketone, ethyl cellosolve, methyl cellosolve, butyl cellosolve, hexyl cellosolve, ethylene glycol dimethyl ether, diethylene glycol dimethyl ether, diethyl ether, ethylene glycol monoethyl ether acetate and diethylene glycol monobutyl ether acetate, may be mentioned. For an improvement in the smoothness of the coating film and in the distinctness of image after the application of a top coating, a part of the α,β-unsaturated monocarboxylic acid to be addition-reacted to the epoxy resin, may be substituted within a range of from 0.1 to 0.8 mol, by an unsaturated or saturated fatty acid having at least 12 carbon atoms. In such a case, the reaction temperature and the solvent may be the same as in the case of the reaction of the α,β-unsaturated monocarboxylic acid. This unsaturated or saturated fatty acid may be, for example, soybean oil fatty acid, cotton oil fatty acid, coconut oil fatty acid, tung oil fatty acid, linseed oil fatty acid, dehydrated castor oil fatty acid or conjugated dehydrated castor oil fatty acid. If the unsaturated or saturated fatty acid is less than 0.1 mol, the effect for the improvement in the smoothness of the coating film or in the distinctness of image after the application of a top coating tends to be less. On the other hand, if it exceeds 0.8 mol, the coating film properties such as the curability, the solvent resistance, the corrosion resistance, etc. tend to deteriorate.

Component (C) to be used in the present invention is a reaction product obtained by the addition reaction of an epoxy resin containing at least two epoxy groups per molecule, like in the case of component (B), with from 0.5 to 1.5 mol of an α,β-unsaturated monocarboxylic acid and from 0.5 to 1.5 mol of a secondary amine. However, the total amount of the two reactants is within a range of from 1.5 to 2.0 mol.

The reaction sequence is such that firstly the secondary amine is reacted to the epoxy resin, and then the α,β-unsaturated monocarboxylic acid is reacted thereto. The type of the secondary amine to be used for this reaction, may be the same as used for component (A). If necessary, a solvent may be used, and the type of the solvent may be the same as used for component (B). The type of the α,β-unsaturated monocarboxylic acid to be reacted with the epoxy groups, the reaction temperature and the type of the solvent to be used as the case requires, may be the same as used for component (B) used in the present invention. The amounts of the secondary amine and the α,β-unsaturated monocarboxylic acid to be reacted to the epoxy groups, are from 0.5 to 1.5 mol in each case, and the total amount of the two reactants is within a range of from 1.5 to 2.0 mol for the same reason as in the case of component (B). If the amount of the secondary amine to be reacted is less than 0.5 mol, the effect for the improvement in the corrosion resistance tends to be less. On the other hand, if the amount exceeds 1.5 mol, the amount of the α,β-unsaturated monocarboxylic acid tends to be too small, whereby the curability tends to be low.

Component (C) to be used in the present invention is not a water-soluble resin, but serves to improve the compatibility of component (A) as a water-soluble resin and component (B) as a water-insoluble resin and thus improve the corrosion resistance. Thus, component (C) is expected to provide an effect rather as an additive, and therefore, the amount is restricted within a range of from 5 to 50 parts by weight relative to 100 parts by weight of component (A). If the amount is less than 5 parts by weight, the effect for the improvement in the corrosion resistance by the addition of component (C) tends to be small. On the other hand, if the amount exceeds 50 parts by weight, the stability of the aqueous dispersion of components (A), (B) and (C) tends to deteriorate.

Component (D) which may be used in the present invention as the case requires, is a water-dilutable resin commonly employed as a water-dilutable coating material, such as a water-dilutable alkyd resin, a water-dilutable phenol resin or a water-dilutable melamine resin. Here, the "water-dilutable resin" is meant for a water-soluble or water-dispersible resin. This water-dilutable resin is added within a range of from 0 to 100 parts by weight relative to 100 parts by weight of component (A) to provide the desired properties required for the coating composition or for the film. In this case, if component (D) is more than 100 parts by weight, the corrosion resistance of the coating film tends to be low.

The cathodic electrodeposition coating composition of the present invention can be obtained by thoroughly mixing components (A), (B), (C) and (D), neutralizing the mixture with an acid, and dissolving or dispersing the mixture in water.

Further, a coloring pigment, an extender pigment, a rust-preventive pigment, a dyestuff, a solvent or any other additives which may commonly be employed in water-dilutable paints, may be incorporated to the composition of the present invention.

Now, the present invention will be described in detail with reference to Examples and Comparative Examples However, it should be understood that the present invention is by no means restricted to these specific Examples.

Here, "parts" and "%" mean "parts by weight" and "% by weight".

PREPARATION EXAMPLE 1

Into a 2 liter flask equipped with a stirrer, a thermometer, a condenser and a nitrogen supply tube, 420 g of an epoxidized polybutadiene (E1800-6.5, trade name, manufactured by Nippon Petrochemicals Co., Ltd.) having a number average molecular weight of 1,800 and an oxirane oxygen content of 6.5% was introduced. Then, 47.2 g of an aqueous solution containing 50% of dimethylamine and 132 g of ethyl cellosolve were added thereto, and the mixture was reacted at 145° C. for 6 hours. Then, 2 g of hydroquinone and 30 g of acrylic acid were added thereto, and the mixture was reacted at 120° C. for 4 hours to obtain a resin [(A)-1]of component (A) having an acid value of 2.5 and a resin solid content of 75%. The resin (A)-1 had a number average molecular weight of 2,200 and contained 98 mmol/100 g resin of the α,β-unsaturated monocarboxylate group, 116 mmol/100 g resin of the tertiary amino group and 1,400 mmol/100 g resin of the carbon-carbon double bond.

PREPARATION EXAMPLE 2

Into a 2 liter flask equipped with a stirrer, a thermometer, a condenser and a nitrogen supply tube, 790 g of an epoxidized polybutadiene (E1500-7.5, trade name, manufactured by Nippon Petrochemicals Co., Ltd.) having a number average molecular weight of 1,500 and an oxirane oxygen content of 7.5% was introduced. Then, 104 g of N-methylethanol amine and 310 g of butyl cellosolve were added thereto, and the mixture was reacted at 120° C. for 6 hours. Then, 6 g of hydroquinone and 52 g of acrylic acid were added thereto, and the mixture was reacted at 130° C. for 4 hours to obtain a resin [(A)-2]of component (A) having an acid value of 3.5 and a resin solid content of 75%. The resin (A)-2 thus obtained had a number average molecular weight of 2,000 and contained 72 mmol/100 g resin of the α,β-unsaturated monocarboxylate group, 146 mmol/100 g resin of the tertiary amino group and 1,450 mmol/100 g resin of the carbon-carbon double bond.

PREPARATION EXAMPLE 3

Into a 2 liter flask equipped with a stirrer, a thermometer, a condenser and a nitrogen supply tube, 870 g of an epoxy resin (a reaction product of bisphenol A and epichlorohydrin, having an epoxy equivalent of 450–500, Epikote 1001, trade name, manufactured by Shell Chemical Co.) and 322 g of butyl cellosolve were introduced, and the mixture was heated under a nitrogen stream at 80° C. for 3 hours to dissolve the epoxy resin. Then, 1 g of hydroquinone, 129 g of acrylic acid, 5 g of dimethyl benzyl amine and 5 g of butyl cellosolve were added thereto, and the mixture was reacted at 130° C. for 3.5 hours to obtain a resin [(B)-1]of component (B) having an acid value of 2.1 and a solid content of 75%, and having 2.0 mol of the α,β-unsaturated monocarboxylic acid reacted.

COMPARATIVE PREPARATION EXAMPLE 1

Into a 2 liter flask equipped with a stirrer, a thermometer, a condenser and a nitrogen supply tube, 870 g of an epoxy resin (a reaction product of bisphenol A and epichlorohydrin, having an epoxy equivalent of 450–500, Epikote 1001, trade name, manufactured by Shell Chemical Co.) and 307 g of butyl cellosolve were charged, and the mixture was heated under a nitrogen stream at 80° C. for 3 hours to dissolve the epoxy resin. Then, 1 g of hydroquinone, 83 g of acrylic acid, 5 g of dimethyl benzyl amine and 5 g of butyl cellosolve were added thereto, and the mixture was reacted at 120° C. for 4 hours to obtain a resin [(B)-2]of component (B) having an acid value of 0.4 and a solid content of 75% and having 1.3 mol of the α,β-unsaturated monocarboxylic acid reacted.

PREPARATION EXAMPLE 4

Into a 2 liter flask equipped with a stirrer, a thermometer, a condenser and a nitrogen supply tube, 950 g of an epoxy resin (a reaction product of bisphenol A and epichlorohydrin, having an epoxy equivalent of 900–1,000, Epikote 1004, trade name, manufactured by Shell Chemical Co.) and 338 g of ethyl cellosolve were introduced, and the mixture was heated under a nitrogen stream at 80° C. for 3 hours to dissolve the epoxy resin. Then, 1.2 g of hydroquinone, 82 g of methacrylic acid and 5 g of dimethyl benzyl amine were added thereto, and the mixture was reacted at 120° C. for 5 hours to obtain a resin [(B)-3]of component (B) having an acid value of 1.5 and a solid content of 75% and having 1.9 mol of the α,β-unsaturated monocarboxylic acid reacted.

PREPARATION EXAMPLE 5

Into a 2 liter flask equipped with a stirrer, a thermometer, a condenser and a nitrogen supply tube, 784 g of an epoxy resin (a reaction product of bisphenol A and epichlorohydrin, having an epoxy equivalent of 450–500, Epikote 1001, trade name, manufactured by Shell Chemical Co.) and 314 g of butyl cellosolve were introduced, and the mixture was heated under a nitrogen stream at 80° C. for 3 hours to dissolve the epoxy resin. Then, 89 g of linseed oil fatty acid, 0.9 g of hydroquinone, 86 g of acrylic acid and 4.8 g of dimethyl benzyl amine were added thereto, and the mixture was reacted at 130° C. for 5 hours to obtain a resin [(B)-4]of component (B) having an acid value of 1.9 and a solid content of 75% and having 1.5 mol of the α,β-unsaturated monocarboxylic acid and 0.4 mol of the unsaturated fatty acid reacted.

PREPARATION EXAMPLE 6

Into a 2 liter flask equipped with a stirrer, a thermometer, a condenser and a nitrogen supply tube, 1140 g of an epoxy resin (a reaction product of bisphenol A and epichlorohydrin, having an epoxy equivalent of 900–1,000, Epikote 1004, trade name, manufactured by Shell Chemical Co.) and 428 g of cyclohexanone were charged, and the mixture was heated under a nitrogen stream at 80° C. for 3 hours to dissolve the epoxy resin. Then, 116 g of conjugated dehydrated castor oil fatty acid (Hy-diene, trade name, manufactured by Soken Kagaku K.K.), 0.9 g of hydroquinone, 6.3 g of dimethyl benzyl amine and 56 g of acrylic acid were added thereto, and the mixture was reacted at 120° C. for 4 hours to obtain a resin [(B)-5]of component (B) having an acid value of 1.5 and a solid content of 75% and having 1.3 mol of the α,β-unsaturated monocarboxylic acid and 0.7 mol of an unsaturated fatty acid reacted.

PREPARATION EXAMPLE 7

Into a 2 liter flask equipped with a stirrer, a thermometer, a condenser and a nitrogen supply tube, 1140 g of an epoxy resin (a reaction product of bisphenol A and epichlorohydrin, having an epoxy equivalent of 900–1,000, Epikote 1004, trade name, manufactured by Shell Chemical Co.) and 409 g of cyclohexanone were charged, and the mixture was heated under a nitrogen stream at 80° C. for 3 hours to dissolve the epoxy resin. Then, 34 g of conjugated dehydrated castor oil fatty acid (Hy-diene, trade name, manufactured by Soken Kagaku K.K.), 1.2 g of hydroquinone, 6.2 g of dimethyl benzyl amine and 78 g of acrylic acid were added thereto, and the mixture was reacted at 120° C. for 4 hours to obtain a resin [(B)-6]of component (B) having an acid value of 2.0 and a solid content of 75% and having 1.8 mol of the α,β-unsaturated monocarboxylic acid and 0.2 mol of an unsaturated fatty acid reacted.

PREPARATION EXAMPLE 8

Into a 2 liter flask equipped with a stirrer, a thermometer, a condenser and a nitrogen supply tube, 1330 g of an epoxy resin (a reaction product of bisphenol A and epichlorohydrin, having an epoxy equivalent of 900–1,000, Epikote 1004, trade name, manufactured by Shell Chemical Co.) and 470 g of ethyl cellosolve were introduced, and the mixture was heated under a nitrogen stream at 80° C. for 3 hours to dissolve the epoxy resin. Then, 53 g of N-methylethanol amine was added thereto, and the mixture was reacted at 100° C. for 30 minutes. Further, 1 g of hydroquinone, 7 g of dimethyl benzyl amine and 50 g of acrylic acid were added thereto, and the mixture was reacted at 120° C. for 4 hours to obtain a resin [(C)-1] of component (C) having an acid value of 2.5 and a solid content of 75% and having 1.0 mol of the $\alpha,\beta$-unsaturated monocarboxylic acid and 1.0 mol of the secondary amine reacted.

PREPARATION EXAMPLE 9

Into a 2 liter flask equipped with a stirrer, a thermometer, a condenser and a nitrogen supply tube, 1140 g of an epoxy resin (a reaction product of bisphenol A and epichlorohydrin, having an epoxy equivalent of 900–1,000, Epikote 1004, trade name, manufactured by Shell Chemical Co.) and 409 g of ethyl cellosolve were introduced, and the mixture was heated under a nitrogen stream at 80° C. for 3 hours to dissolve the epoxy resin. Then, 28 g of N-methylethanol amine was added thereto, and the mixture was reacted at 100° C. for 30 minutes. Then, 1.2 g of hydroquinone, 80 g of acrylic acid and 6 g of dimethyl benzyl amine were added thereto, and the mixture was reacted at 130° C. for 4 hours to obtain a resin [(C)-2] of component (C) having an acid value of 1.9 and a solid content of 75% and having 1.4 mol of the $\alpha,\beta$-unsaturated monocarboxylic acid and 0.6 mol of the secondary amine reacted.

COMPARATIVE PREPARATION EXAMPLE 2

Into a 2 liter flask equipped with a stirrer, a thermometer, a condenser and a nitrogen supply tube, 1330 g of an epoxy resin (a reaction product of bisphenol A and epichlorohydrin having an epoxy equivalent of 900–1,000, Epikote 1004, trade name, manufactured by Shell Chemical Co.) and 456 g of ethyl cellosolve were introduced, and the mixture was heated under a nitrogen stream at 80° C. for 3 hours to dissolve the epoxy resin. Then, 11 g of N-methylethanol amine was added thereto, and the mixture was reacted at 100° C. for 30 minutes. Further, 1 g of hydroquinone, 7 g of dimethyl benzyl amine and 50 g of acrylic acid were added thereto, and the mixture was reacted at 120° C. for 4 hours to obtain a resin [(C)-3] of component (C) having an acid value of 2.6 and a solid content of 75% and having 1.0 mol of the $\alpha,\beta$-unsaturated monocarboxylic acid and 0.2 mol of the secondary amine reacted.

EXAMPLE 1

133 g of the resin (A)-1, 2.5 g of carbon black and 14 g of titanium oxide were kneaded by a sand mill to obtain a milled paste. To this milled paste, 107 g of the resin (B)-1 and 40 g of the resin (C)-1 were incorporated, and the mixture was thoroughly stirred and then neutralized with 2.5 g of acetic acid. Then, 1.2 g of manganese (II) acetate was added thereto, and the mixture was diluted with deionized water to bring the solid content to 19%, whereby a cathodic electrodeposition coating composition of the present invention was obtained. In this coating composition, electrodeposition was conducted by using a carbon plate as an anode and a zinc phosphate-treated plate as a cathode with an electrode distance of 15 cm and an electrode ratio of 1/1, and then the coating film was dried in air, baked at 165° C. for 20 minutes, and then subjected to the film property tests, whereby the properties of the coating composition such as the weight loss on heating, the corrosion resistance, the distinctness of image after the application of the top coating, etc. were measured or evaluated.

COMPARATIVE EXAMPLE 1

A cathodic electrodeposition coating composition was obtained in the same manner as in Example 1 except that the resin (B)-1 was used in an excess amount of 293 g, and the resin (C)-1 and manganese (II) acetate were used in amounts of 4 g and 1.9 g, respectively. The film property tests of this composition were conducted in the same manner as in Example 1.

COMPARATIVE EXAMPLE 2

A cathodic electrodeposition coating composition was obtained in the same manner as in Example 1 except that the resin (C)-1 was not incorporated. The film property tests of this composition were conducted in the same manner as in Example 1.

EXAMPLE 2

133 g of the resin (A)-1, 2.5 g of carbon black and 14 g of titanium oxide were kneaded by a sand mill to obtain a milled paste. To this milled paste, 200 g of the resin (B)-3, 6.7 g of the resin (C)-2 and 26.7 g of a water-dilutable phenol resin (WP-561, trade name, manufactured by Gun-ei Kagaku K.K., solid content: 75%) as component (D), were added. The mixture was thoroughly stirred, and then neutralized with 2.6 g of acetic acid. Then, 1.6 g of manganese (II) acetate was added thereto, and the mixture was diluted with deionized water to bring the solid content to 19%, whereby a cathodic electrodeposition coating composition of the present invention was obtained.

The film property tests of this composition were conducted in the same manner as in Example 1.

COMPARATIVE EXAMPLE 3

A cathodic electrodeposition coating composition was obtained in the same manner as in Example 2 except that the resin (B)-3 in Example 2 was replaced by 200 g of the resin (B)-2.

The film property tests of this composition were conducted in the same manner as in Example 1.

EXAMPLE 3

133 g of the resin (A)-2, 2.5 g of carbon black and 14 g of titanium oxide were kneaded by a sand mill to obtain a milled paste. To this milled paste, 40 g of the resin (B)-4 and 64 g of the resin (C)-2 were added. The mixture was thoroughly stirred, and then neutralized with 2.5 g of acetic acid. Then, 1.1 g of manganese (II) acetate was added, and the mixture was diluted with deionized water to bring the solid content to 19%, whereby a cathodic electrodeposition coating composition of the present invention was obtained.

The film property tests of this composition were conducted in the same manner as in Example 1.

COMPARATIVE EXAMPLE 4

A cathodic electrodeposition coating composition was obtained in the same manner as in Example 3 except that the resin (C)-2 in Example 3 was replaced by 64 g of the resin (C)-3.

The film property tests of this composition were conducted in the same manner as in Example 1.

EXAMPLE 4

133 g of the resin (A)-1, 2.5 g of carbon black and 14 g of titanium oxide were kneaded by a sand mill to obtain a milled paste. To this milled paste, 67 g of the resin (B)-5 and 67 g of the resin (C)-3 were added. The mixture was thoroughly mixed, and then neutralized with 2.5 g of acetic acid. Then, 1.2 g of manganese (II) acetate was added thereto, and the mixture was diluted with deionized water to bring the solid content to 19%, whereby a cathodic electrodeposition coating composition of the present invention was obtained.

The film property tests of this composition were conducted in the same manner as in Example 1.

EXAMPLE 5

133 g of the resin (A)-2, 2.5 g of carbon black and 14 g of titanium oxide were kneaded by a sand mill to obtain a milled paste. To this milled paste, 27 g of the resin (B)-3 and 64 g of the resin (C)-1 were added. The mixture was thoroughly stirred, and then neutralized with 2.7 g of acetic acid. Then, 1.0 g of manganese (II) acetate was added, and the mixture was diluted with deionized water to bring the solid content to 19%, whereby a cathodic electrodeposition coating composition of the present invention was obtained.

The film property tests of this composition were conducted in the same manner as in Example 1.

EXAMPLE 6

133 g of the resin (A)-2, 2.5 g of carbon black and 14 g of titanium oxide were kneaded by a sand mill to obtain a milled paste. To this milled paste, 267 g of the resin (B)-5, 67 g of the resin (C)-2 and 27 g of a water-dilutable phenol resin (the same as in Example 2) as component (D), were added. The mixture was thoroughly stirred, and then neutralized with 4 g of lactic acid. Then, 2 g of manganese (II) acetate was added thereto, and the mixture was diluted with deionized water to bring the solid content to 19%, whereby a cathodic electrodeposition coating composition of the present invention was obtained.

The film property tests of this composition were conducted in the same manner as in Example 1.

EXAMPLE 7

133 g of the resin (A)-2, 2.5 g of carbon black and 14 g of titanium oxide were kneaded by a sand mill to obtain a milled paste. To this milled paste, 27 g of the resin (B)-5 and 6.7 g of the resin (C)-2 were added. The mixture was thoroughly stirred, and then neutralized with 2.5 g of acetic acid. Then, 0.8 g of manganese (II) acetate was added thereto, and the mixture was diluted with deionized water to bring the solid content to 19%, whereby the cathodic electrodeposition coating composition of the present invention was obtained.

The film property tests of this composition were conducted in the same manner as in Example 1.

EXAMPLE 8

133 g of the resin (A)-1, 2.5 g of carbon black and 14 g of titanium oxide were kneaded by a sand mill to obtain a milled paste. To this milled paste, 27 g of the resin (B)-6, and 6.7 g of the resin (C)-1 were added. The mixture was thoroughly stirred, and then neutralized with 4 g of lactic acid. Then, 0.8 g of manganese (II) acetate was added thereto, and the mixture was diluted with deionized water to bring the solid content to 19%, whereby a cathodic electrodeposition coating composition of the present invention was obtained.

The film property tests of this composition were conducted in the same manner as in Example 1.

EXAMPLE 9

133 g of the resin (A)-2, 2.5 g of carbon black and 14 g of titanium oxide were kneaded by a sand mill to obtain a milled paste. To this paste, 133 g of the resin (B)-6, 40 g of the resin (C)-1 and 27 g of a water-dilutable phenol resin (the same as in Example 2) as component (D), were added. The mixture was thoroughly stirred, and then neutralized with 4.8 g of lactic acid. Then, 1.4 g of manganese (II) acetate was added thereto, and the mixture was diluted with deionized water to bring the solid content to 19%, whereby the cathodic electrodeposition coating composition of the present invention was obtained.

The film property tests of this composition were conducted in the same manner as in Example 1.

COMPARATIVE EXAMPLE 5

A cathodic electrodeposition coating composition was obtained in the same manner as in Example 5 except that the resin (C)-1 in Example 5 was changed to 75 g.

The film property tests of this composition were conducted in the same manner as in Example 1.

COMPARATIVE EXAMPLE 6

Into a 2 liter flask equipped with a stirrer, a thermometer, a condenser and a nitrogen supply tube, 500 g of an epoxy resin (a reaction product of bisphenol A and epichlorohydrin having an epoxy equivalent of 450–500, Epikote 1001, trade name, manufactured by Shell Chemical Co.) and 500 g of ethyl cellosolve were introduced, and the mixture was heated under a nitrogen stream at 80° C. for 3 hours to dissolve the epoxy resin. To this solution, 125 g of diethanol amine was dropwise added at a temperature of from 60 to 70° C., and the mixture was reacted at 80° C. for 3 hours to obtain a reaction product (i).

Separately, 87 g of a mixture comprising 80% of 2,4-tolylene diisocyanate and 20% of 2,6-tolylene diisocyanate, was stirred at 60° C., and a solution obtained by dissolving 65 g of 2-ethylhexanol in 65 g of ethyl cellosolve, was gradually added thereto under stirring at 60° C. The mixture was reacted at 60° C. for 3 hours to obtain an addition reaction product (ii).

The addition reaction product (ii) was gradually dropwise added at room temperature to the above reaction product (i), and the mixture was reacted at 40° C. for 2 hours and at 50° C. for 1 hour to obtain a conventional type cationic epoxy resin having a solid content of 70%. Then, 600 g of this conventional type cationic epoxy resin, 2.5 g of carbon black and 14 g of titanium oxide were kneaded by a sand mill. The mixture was neutralized with 15.2 g of lactic acid, and further diluted with deionized water to bring the solid content to 19%, whereby a cathodic electrodeposition coating composition was obtained.

The film property tests of this composition were conducted in the same manner as in Example 1.

COMPARATIVE EXAMPLE 7

A cathodic electrodeposition coating composition was obtained in the same manner as in Example 7 except that the resin (C)-2 in Example 7 was not added.

The film property tests of this composition were conducted in the same manner as in Example 1.

COMPARATIVE EXAMPLE 8

Firstly, 450 g of tolylene diisocyanate (a mixture comprising about 80% of 2,4-tolylene diisocyanate and about 20% of 2,6-tolylene diisocyanate) was introduced into a 2 liter flask. Then, 850 g of ethyl cellosolve was gradually dropwise added thereto under stirring over a period of 2.5 hours. Then, the mixture was heated to 80° C., and reacted for 1 hour to obtain a blocked isocyanate compound [(C)-4].

In the same manner as in Example 2, 133 g of the resin (A)-1, 2.5 g of carbon black and 14 g of titanium oxide were kneaded by a sand mill to obtain a milled paste. To this milled paste, 200 g of the resin (B)-3 and 20 g of the above compound (C)-4 were added. The mixture was thoroughly stirred, and then neutralized with 3.2 g of acetic acid. Then, 2.2 g of manganese (II) acetate was added, and the mixture was diluted with deionized water to bring the solid content to 19%, whereby a cathodic electrodeposition coating composition wa obtained.

The film property tests of this composition were conducted in the same manner as in Example 1.

The test results of the above Examples and Comparative Examples are shown in Table 1.

It is evident from Table 1 that as compared with the compositions of Comparative Examples 1 to 8, the compositions of Examples 1 to 9 are superior in the reduction of the weight loss of the coating film during the baking, in the corrosion resistance, in the low temperature curability, in the film properties, in the thick film forming properties, in the outer appearance of the coating film on the galvanized steel plate and in the distinctness of image after the application of the top coating.

TABLE 1

| Paint properties | Example 1 | Comparative Example 1 | Comparative Example 2 | Example 2 | Comparative Example 3 | Example 3 | Comparative Example 4 | Example 4 | Example 5 |
|---|---|---|---|---|---|---|---|---|---|
| Weight loss on heating (*1) | ◎ | ◎ | ◎ | ◎ | ◎ | ◎ | ◎ | ◎ | ◎ |
| Solvent resistance (*2) | ◎ | △ | × | ◎ | △ | ◎ | △ | ○ | ◎ |
| Impact resistance (*3) | ○ | ○ | △ | ○ | △ | ◎ | △ | ◎ | ○ |
| Corrosion resistance (*4) | ◎ | △ | △ | ○ | △ | ◎ | △ | ○ | ◎ |
| Smoothness of film surface (*5) | ○ | △ | △ | ○ | × | ○ | △ | ◎ | ○ |
| Distinctness of image (*6) | ○ | △ | × | ○ | △ | ○ | △ | ◎ | ○ |
| Low-temperature curability (*7) | ◎ | × | × | ○ | △ | ◎ | × | ○ | ◎ |
| Thick film forming property (*8) | ○ | × | △ | ○ | △ | ◎ | △ | ◎ | ○ |
| Outer appearance of coating film on galvanized steel plate (*9) | ○ | △ | △ | ○ | ○ | ◎ | △ | ◎ | ○ |
| Filtrability of coating composition (*10) | ◎ | × | △ | ○ | × | ◎ | ○ | ◎ | ○ |
| Stability of coating composition (*11) | ◎ | × | ○ | ○ | × | ◎ | ○ | ◎ | ◎ |

Table 1 (continued)

| Paint properties | Example 6 | Example 7 | Example 8 | Example 9 | Comparative Example 5 | Comparative Example 6 | Comparative Example 7 | Comparative Example 8 |
|---|---|---|---|---|---|---|---|---|
| Weight loss on heating (*1) | ◎ | ◎ | ◎ | ◎ | ◎ | × | △ | ◎ |
| Solvent resistance (*2) | ◎ | ○ | ○ | ◎ | ◎ | × | △ | △ |
| Impact resistance (*3) | ◎ | ◎ | ○ | ◎ | ○ | △ | △ | ○ |
| Corrosion resistance (*4) | ◎ | ○ | ○ | ◎ | ○ | ◎ | △ | △ |
| Smoothness of film surface (*5) | ○ | ◎ | ○ | ○ | △ | ○ | △ | ○ |
| Distinctness of image (*6) | ○ | ◎ | ○ | ○ | △ | ○ | △ | △ |
| Low-temperature curability (*7) | ○ | ○ | ○ | ○ | ◎ | × | △ | △ |
| Thick film forming property (*8) | ◎ | ◎ | ◎ | ○ | ○ | × | × | △ |
| Outer appearance of coating film on galvanized steel plate (*9) | ◎ | ◎ | ◎ | ○ | ○ | × | △ | △ |
| Filtrability of coating composition (*10) | ○ | ◎ | ○ | ○ | ○ | ○ | △ | ○ |
| Stability of coating composition (*11) | ○ | ◎ | ◎ | ○ | × | ○ | △ | △ |

TABLE 1-continued composition (*11)

(*1) Weight loss on heating:
$$\frac{(W_2 - W_1) - (W_3 - W_1)}{(W_2 - W_1)} \times 100\%$$
$W_1$: The weight of the zinc phosphate treated plate
$W_2$: The weight after the baking at 75° C. for 45 minutes after the electrodeposition coating
$W_3$: the weight after the baking at 170° C. for 20 minutes
Evaluation standards:
⊚: Weight loss on heating being less than 5%
○: Weight loss on heating being from 5 to less than 10%
Δ: Weight loss on heating being from 10 to less than 15%
X: Weight loss on heating being at least 15%
(*2) Solvent resistance:
The coating layer was rubbed with a gauze impregnated with acetone 50 times by a reciprocal rubbing operation, and the solvent resistance was evaluated as follows.
Evaluation standards:
⊚: No change
○: Gloss slightly reduced
Δ: Scratch marks observed on the coating film
X: Solubilization of the coating layer observed
(*3) Impact resistance:
Tested by ½ inches in diameter × 500 g
Evaluation standards:
⊚: More than 50 cm
○: 50 cm
Δ: 40 cm
X: 30 cm or less
(*4) Corrosion resistance:
In accordance with JIS K5400, a cut line reaching to the substrate was made on the coating layer, and a salt spray test was conducted. After spraying a salt water for 1,000 hours, the evaluation was made for the width of the rust and the width of peeling on one side.
Evaluation standards:
⊚: Less than 1 mm
○: Less than 3 mm
Δ: From 3 mm to less than 5 mm
X: At least 5 mm
(*5) Smoothness of the film surface:
Visual evaluation standards:
⊚: Smooth surface with no distinct roughening
○: Smooth surface with slight roughening
Δ: Distinct roughening
X: Roughening over the entire surface
(*6) Distinctness of image after the application of the top coating:
A melamine alkyd paint was coated as a top coating on the electrodepostion coaing film and evaluated by 2C/2B (two coat/two bake). Four slender parallel lines reflected on the coating film were observed.
Evaluation standards:
⊚: Four slender parallel lines clearly reflected on.
○: The four lines are distinctive although slightly fogged.
Δ: Substantially fogged and the lines are not so distinctive.
X: The lines are not distinctive at all and look like a wide single line.
(*7) Low temperature curability:
After the baking at 140° C. for 30 minutes, the coating layer was rubbed with a gauze impregnated with acetone 50 times by a reciprocal rubbing operation, and then the curability was evaluated.
Evaluation standards:
⊚: No change
○: Gloss slightly reduced
Δ: Scratch marks were observed on the coating film
X: Dissolution of the coating film observed
(*8) Thick film forming property:
The film thickness after an application of a voltage of from 250 to 300 V for 3 minutes.
Evaluation standards:
⊚: 35–40 μm depositable
○: 30–35 μm depositable
Δ: 27–30 μm depositable
X: Less than 27 μm or not depositable
(*9) Outer appearance of the coating film on a galvanized steel plate:
Evaluation standards:
⊚: Excellent outer appearance without pinholes, hard spots or craters
○: Hard spots are slightly observed, although no pinholes and craters are observed.
Δ: Pinholes, hard spots and craters are observed to some extent.
X: Pinholes, hard spots and craters are observed over the entire surface.
(*10) Filtrability of the coating composition:
The coating composition was filtered through a metal net of 300 mesh, and the amount of the filtration residue was evaluted.
Evaluation standards:
⊚: No agglomerate
○: Some agglomerate observed, but no adverse effect is brought about.
Δ: Substantial agglomerate
X: Agglomerate is so much that the filtration is difficult.
(*11) Stability of the coating composition:
The coating composition is stirred at 30° C. for 15 days by a magnetic stirrer, and then filtered through a metal net of 300 mesh, and the amount of the filtration residue was evaluted.
Evaluation standards:
⊚: No agglomerate
○: Some agglomerate observed, but no adverse effect is brought about.
Δ: Substantial agglomerate
X: Agglomerate is so much that the filtration is difficult.

We claim:
1. A cathodic electrodeposition coating composition which comprises:
(A) 100 parts by weight of an amine-unsaturated carboxylic acid adduct of epoxidized polybutadiene having a number average molecular weight of from 500 to 10,000 and containing from 70 to 200 mmol of a tertiary amino group, from 20 to 200 mmol of an α,β-unsaturated monocarboxylate group and from 200 to 2,000 mmol of a carbon-carbon double bond, per 100 g of the resin;

(B) from 20 to 200 parts by weight of an addition reaction product of (a) 1 mol of an epoxy resin containing at least two epoxy groups per molecule, and (b) from 1.5 to 2.0 mol of an α,β-unsaturated monocarboxylic acid;

(C) from 5 to 50 parts by weight of an addition reaction product other than (A) of (a) 1 mol of an epoxy resin containing at least two epoxy groups per molecule, and (b) a mixture of from 0.5 to 1.5 mol of an α,β-unsaturated monocarboxylic acid and from 0.5 to 1.5 mol of a secondary amine, provided that the total amount of the two components of the mixture is from 1.5 to 2.0 mol; and (D) from 0 to 100 parts by weight of other water-dilutable resin.

2. The cathodic electrodeposition coating composition according to claim 1, wherein the epoxy resin in each of components (B) and (C) is a bisphenol A type epoxy resin having an epoxy equivalent of from 400 to 1,000.

3. The cathodic electrodeposition coating composition according to claim 1, wherein the α,β-unsaturated monocarboxylic acid is acrylic acid, methacrylic acid or a mixture thereof.

4. A cathodic electrodeposition coating composition which comprises:

(A) 100 parts by weight of an amine-unsaturated carboxylic acid adduct of epoxidized polybutadiene having a number average molecular weight of from 500 to 10,000 and containing from 70 to 200 mmol of a tertiary amino group, from 20 to 200 mmol of an α,β-unsaturated monocarboxylate group and from 200 to 2,000 mmol of a carbon-carbon double bond, per 100 g of the resin;

(B) from 20 to 200 parts by weight of an addition reaction product of (a) 1 mol of an epoxy resin containing at least two epoxy groups per molecule, and (b) a mixture of from 0.7 to 1.9 mol of an α,β-unsaturated monocarboxylic acid and from 0.1 to 0.8 mol of an unsaturated or saturated fatty acid having at least 12 carbon atoms, provided that the total amount of the two components of the mixture is from 1.5 to 2.0 mol;

(C) from 5 to 50 parts by weight of an addition reaction product other than (A) of (a) 1 mol of an epoxy resin containing at least two epoxy groups per molecule, and (b) a mixture of from 0.5 to 1.5 mol of an α,β-unsaturated monocarboxylic acid and from 0.5 to 1.5 mol of a secondary amine, provided that the total amount of the two components of the mixture is from 1.5 to 2.0 mol; and (D) from 0 to 100 parts by weight of other water-dilutable resin.

5. The cathodic electrodeposition coating composition according to claim 4, wherein the epoxy resin in each of components (B) and (C) is a bisphenol A type epoxy resin having an epoxy equivalent of from 400 to 1,000.

6. The cathodic electrodeposition coating composition according to claim 4, wherein the α,β-unsaturated monocarboxylic acid is acrylic acid, methacrylic acid or a mixture thereof.

7. The cathodic electrodeposition coating composition according to claim 4, wherein the unsaturated or saturated fatty acid having at least 12 carbon atoms is at least one member selected from the group consisting of soybean oil fatty acid, cotton oil fatty acid, coconut oil fatty acid, tung oil fatty acid, linseed oil fatty acid, dehydrated castor oil fatty acid and conjugated dehydrated castor oil fatty acid.

8. The catholic electrodeposition coating composition according to claim 1, wherein the epoxy resin of component (C) is a bisphenol A type epoxy resin, a novolak or resol epoxy resin, an epoxy resin obtained by reacting a halogenated phenol with epichlorohydrin or with methyl epichlorohydrin, or an epoxy resin obtained by reacting an ethylene oxide or propylene oxide adduct of a phenol with epichlorohydrin or with methyl epichlorohydrin.

9. The catholic electrodeposition coating composition according to claim 4, wherein the epoxy resin of component (C) is a bisphenol A type epoxy resin, a novolak or resol epoxy resin, an epoxy resin obtained by reacting a halogenated phenol with epichlorohydrin or with methyl epichlorohydrin, or an epoxy resin obtained by reacting an ethylene oxide or propylene oxide adduct of a phenol with epichlorohydrin or with methyl epichlorohydrin.

* * * * *